United States Patent
Shterenberg et al.

(10) Patent No.: US 11,658,279 B2
(45) Date of Patent: May 23, 2023

(54) METHOD FOR CONFIGURING AND PRELITHIATING A FAST CHARGING CELL

(71) Applicant: Storedot Ltd., Herzeliya (IL)

(72) Inventors: Ivgeni Shterenberg, Ra'anana (IL); Eran Sella, Tel-Aviv (IL); Eynat Matzner, Adi (IL); Shirel Cohen, Tel Aviv (IL); Hadar Mazor Shafir, Tel Aviv (IL); Daniel Aronov, Netanya (IL)

(73) Assignee: STOREDOT LTD., Herzeliya (IL)

( * ) Notice: Subject to any disclaimer, the term of this patent is extended or adjusted under 35 U.S.C. 154(b) by 235 days.

(21) Appl. No.: 16/735,737

(22) Filed: Jan. 7, 2020

(65) Prior Publication Data

US 2021/0210741 A1    Jul. 8, 2021

(51) Int. Cl.
| | |
|---|---|
| H01M 4/04 | (2006.01) |
| H01M 4/1395 | (2010.01) |
| H01M 4/38 | (2006.01) |
| H01M 10/0525 | (2010.01) |
| H01M 10/02 | (2006.01) |
| H01M 4/02 | (2006.01) |

(52) U.S. Cl.
CPC ....... *H01M 4/0445* (2013.01); *H01M 4/1395* (2013.01); *H01M 4/386* (2013.01); *H01M 4/387* (2013.01); *H01M 10/02* (2013.01); *H01M 10/0525* (2013.01); *H01M 2004/027* (2013.01)

(58) Field of Classification Search
CPC .. H01M 4/0445; H01M 4/1395; H01M 4/386; H01M 4/387; H01M 10/02; H01M 10/0525; H01M 2004/027
See application file for complete search history.

(56) References Cited

U.S. PATENT DOCUMENTS

| | | | |
|---|---|---|---|
| 9,472,804 B2 | 10/2016 | Burshtain et al. | |
| 10,096,859 B2 | 10/2018 | Burshtain et al. | |
| 10,199,677 B2 | 2/2019 | Drach et al. | |
| 10,454,101 B2 | 10/2019 | Jacob et al. | |
| 2014/0050972 A1* | 2/2014 | Amiruddin | H01M 10/0525 429/188 |
| 2017/0294687 A1 | 10/2017 | Burshtain et al. | |
| 2019/0288273 A1* | 9/2019 | Yang | H01M 10/0563 |
| 2019/0356013 A1 | 11/2019 | Sella et al. | |
| 2020/0395593 A1* | 12/2020 | Zhu | H01M 10/058 |

FOREIGN PATENT DOCUMENTS

WO    WO 2018/109774    6/2018

* cited by examiner

*Primary Examiner* — Christopher P Domone
*Assistant Examiner* — Kimberly Wyluda
(74) *Attorney, Agent, or Firm* — Reches Patents

(57) ABSTRACT

Prelithiation methods and fast charging lithium ion cell are provided, which combine high energy density and high power density. Several structural and chemical modifications are disclosed to enable combination of features that achieve both goals simultaneously in fast charging cells having long cycling lifetime. The cells have anodes with high content of Si, Ge and/or Sn as principal anode material, and cathodes providing a relatively low C/A ratio, with the anodes being prelithiated to have a high lithium content, provided by a prelithiation algorithm. Disclosed algorithms determine lithium content achieved through prelithiation by optimizing the electrolyte to increase cycling lifetime, adjusting energy density with respect to other cell parameters, and possibly reducing the C/A ratio to maintain the required cycling lifetime.

10 Claims, 3 Drawing Sheets

METHOD FOR CONFIGURING AND PRELITHIATING A FAST CHARGING CELL

BACKGROUND OF THE INVENTION

1. Technical Field

The present invention relates to the field of lithium ion batteries, and more particularly, to battery configurations which are fast-charging, both energy and power dense and have a long cycling lifetime.

2. Discussion of Related Art

Typical lithium ion batteries are either energy dense or power dense. Additional challenges involve producing fast charging batteries with long cycling lifetime.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a method comprising prelithiating at least one anode of a fast charging cell to reach a lithium content determined by an anode content of at least one of Si, Ge and Sn, anode capacity loss during formation and a required cycling lifetime, optimizing an electrolyte of the cell to increase cycling lifetime, adjusting an energy density of the cell by increasing the determined lithium content, as long as the required cycling lifetime is maintained, and reducing a C/A (cathode to anode load) ratio according to the determined lithium content and the adjusted energy density.

One aspect of the present invention provides a fast charging lithium ion cell comprising: at least one anode, comprising at least 20 wt % of at least one of Si, Ge and Sn, and prelithiated to have a lithium content of at least 40% from calculated anode capacity, and at least one cathode at a C/A (cathode to anode) ratio of 0.75 or less.

One aspect of the present invention provides a battery cell suitable for fast charging and having a high energy density, the battery cell comprising: at least one anode, comprising at least one of Si, Ge and Sn, and having a capacity between 500 and 2500 mAh/gr, wherein the at least one anode is prelithiated to have a lithium content between 25 and 65%, at least one cathode, and electrolyte; wherein a C/A (cathode to anode) ratio of the battery cell is between 0.4 and 0.75.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
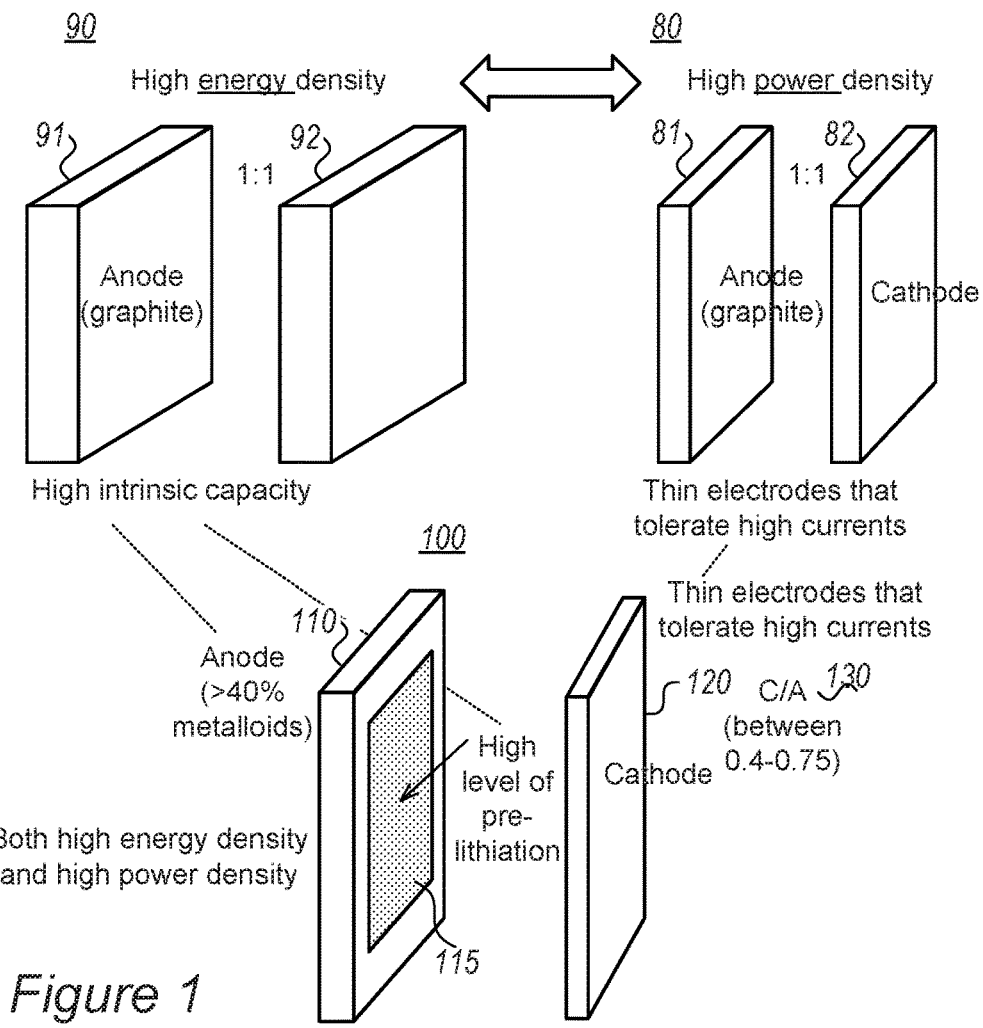
FIG. 1 is a high-level schematic illustration of a fast charging lithium ion cell, according to some embodiments of the invention, compared to prior art cells.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Embodiments of the present invention provide efficient and economical methods and mechanism for configuring and prelithiating fast-charging lithium ion cells and thereby provide fast-charging lithium ion cells which are both energy and power dense. Prelithiation methods and fast charging lithium ion cell are provided, which combine high energy density and high power density. Several structural and chemical modifications are disclosed to enable combinations of features that achieve both goals simultaneously in fast charging cells having long cycling lifetime. The cells have anodes with high content of Si, Ge and/or Sn as principal anode material, and cathodes providing a relatively low C/A ratio, with the anodes being prelithiated to have a high lithium content, provided by a prelithiation algorithm. Disclosed algorithms determine lithium content achieved through prelithiation by optimizing the electrolyte to increase cycling lifetime, adjusting energy density with respect to other cell parameters, and possibly reducing the C/A ratio to maintain the required cycling lifetime.

FIG. 1 is a high-level schematic illustration of a fast charging lithium ion cell 100, according to some embodiments of the invention, compared to prior art cells 80, 90. It is noted that only anodes and cathodes of the cells are shown, while other battery components such as separator(s), electrolyte, pouch etc. are not shown. Fast charging lithium ion cells 100 comprise at least one anode 110, comprising at least 20 wt %, at least 30 wt % or at least 40 wt % (of active material from total anode material) of at least one of Si, Ge and Sn, and prelithiated (115, shown schematically) to have a lithium content of at least 20%, 30%, 40% or more from calculated anode capacity; and at least one cathode 120 at a C/A (cathode to anode) ratio (130) of 0.9, 0.8, 0.7 or less (C/A is defined by dividing the calculated cathode capacity by the calculated anode capacity having the same area). Anode(s) 110 and cathode(s) 120 may be enclosed with electrolyte and at least one separator within a pouch to form a battery.

Advantageously, disclosed embodiments achieve, simultaneously, two major challenges of conventional Li-ion batteries, namely both high energy density and high power (e.g., high currents and fast charging, e.g., at 5 C, 10 C or more), without compromising cycling lifetime requirements. Prior art lithium ion batteries typically have either a high energy density, illustrated schematically as cells 90—using high load electrode(s) 91, 92 having high intrinsic capacity, typically using graphite anodes 91; or a high power density, illustrated schematically as cells 80—using thin electrodes 81, 82 that can tolerate high currents, e.g., in fast charging applications.

In contrast, disclosed cells 100 combine high energy density with high power density (enabling, e.g., operation at high charging rates of at least 4 C, 5 C, 10 C, 20 C or more)—by using anodes 110 having a high capacity metalloid-based active material, e.g., with at least 20 wt %, at least 30 wt % or at least 40 wt % of Si, Ge and/or Sn active material (from total anode material weight), by applying a high level of anode prelithiation 115 that stabilizes the anode and increases its lithium content, and by using thin and smaller cathodes, providing a cathode to anode (C/A) ratio of 0.9, 0.8, 0.7 or less, to further increase the energy density of the cell. High energy density and high power density are provided by the anode active materials that have high capacity at a relatively low anode load compared to prior art graphite or graphite/metalloid anodes that typically have low capacity. High level of prelithiation 115 provides controlled SEI formation on anodes 110, stabilizing the anodes during fast charging and reducing the cell degradation rate due to lithium consumption (e.g., by Si, Ge and/or Sn) and electrolyte consumption during operation—increasing the cycling lifetime of the cells. The high lithium content achieved by prelithiation increases the energy density and partly compensates for the smaller cathodes. The smaller cathodes also save space, increasing the energy density as well as the discharging rates, emphasizing high power density during fast charging. The combination of high level of anode prelithiation 115 and the with low C/A ratio 130 may further supports achieving high energy density by reducing the electrolyte loss during formation. high level of anode prelithiation 115.

Advantageously, disclosed cells 100 provide both high energy densities and high power densities, support fast charging applications and have prolonged cycling lifetimes.

Figure 2:
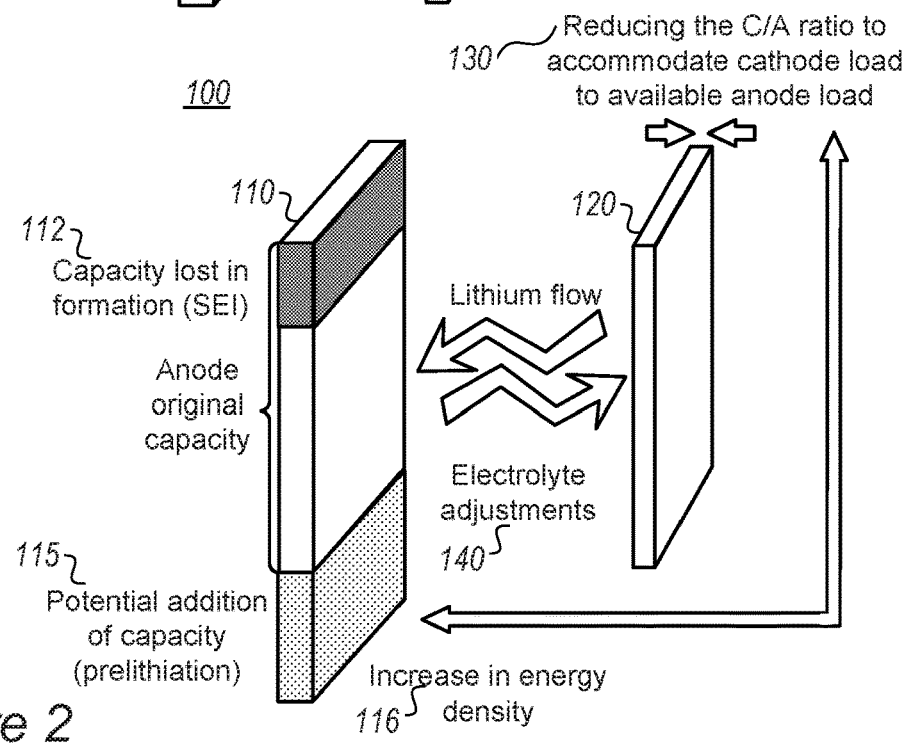
FIG. 2 is a high-level schematic illustration of prelithiation and cell component optimization according to disclosed algorithms, according to some embodiments of the invention

FIG. 2 is a high-level schematic illustration of prelithiation 115 and cell component optimization according to disclosed algorithms, according to some embodiments of the invention. FIG. 2 illustrates in a highly schematic manner the stages and considerations taken into account in disclosed algorithms, which may be used, without being bound by theory. Anode 110 is illustrated schematically as having an original capacity, which is reduced by a certain capacity loss 112 during the formation process. For example, capacity is typically lost in forming the SEI (solid electrolyte interphase) on Si, Ge and/or Sn anode material, which incorporates lithium and electrolyte decomposition products. In such cells, capacity loss 112 is typically several tens of percent of the anode original capacity, e.g., 20%, 30%, etc.

Disclosed prelithiation 115 is seen herein as providing a potential for additional capacity, compensating for at least some of the lithium lost during formation (112) and possibly over-compensating to increase any of the cell's capacity, its energy density (116) and/or its cycling lifetime—as the added lithium may be used to support more charge in cell 100 and/or counter cell degradation related to loss of lithium.

Anode and cathode electrode loads are typically defined as the amount of active material per electrode area (e.g., in $mg/cm^2$), expressing spatial parameters of the electrode such as thickness and porosity. The theoretical capacity is typically defined as the capacity per weight (e.g., in mAh/mg), expressing the lithiation efficiency of the active material. The cathode to anode (C/A) ratio is typically defined as the ratio between the cathode and the anode—of the product of the electrode load and the theoretical capacity (the units of the product are $mAh/cm^2$, expressing the resulting charge density on the electrodes). It is noted that in calculating the C/A ratio, only the electrochemically active surface areas of the anode and cathode are taken into account—typically the surfaces of the anode and cathode that face each other and take part in the lithium flow through the electrolyte (see schematic illustration in FIG. 2), without border areas that may be used to protect current collectors or for other reasons.

Returning to disclosed prelithiation 115, it is noted that if prelithiation 115 adds too much capacity to cell 100, e.g., in order to achieve higher energy density 116 and/or longer cycling lifetime, cathodes 120 with capacity that is higher than the remaining capacity of anodes 110 (after capacity loss 112) may cause metallization on anodes 110, as the latter may not be able to receive all the lithium from cathodes 120. Accordingly, and somewhat counter-intuitively, the C/A ratio may be reduced 130 (e.g., by making cathodes 120 thinner, more porous or reducing the amount of active material)—to accommodate the cathode load to the available anode load. For example, the C/A ratio may be reduced below any of 1, 0.9, 0.8, 0.7, intermediate values, or smaller values. A schematic, non-limiting example is provided in FIG. 4C below.

In certain embodiments, anode(s) 110 may be prelithiated 115 to reach a specified lithium content that is influenced and determined by various parameters, such as (i) the anode active material content (e.g., anode load and/or theoretical capacity of Si, Ge and Sn), (ii) the anode capacity loss 112 during formation, e.g., as determined in prior experiments, and (iii) a required cycling lifetime. Then, electrolyte adjustments 140 may be carried out by adjusting components and optimizing the electrolyte in the cell (and/or possibly the electrolyte used to carry out the formation process) to increase cycling lifetime. For example, the types of linear and cyclic solvents and their amounts may be adjusted, the types and amounts of additives may be adjusted and/or the type(s) of lithium salts in the electrolyte may be adjusted. Consecutively, energy density 116 may be adjusted, e.g., increased, by increasing the determined lithium content, as long as the required cycling lifetime is maintained (e.g., as measured in experiments), and finally, C/A ratio may be reduced 130, according to the determined lithium content and the adjusted energy density.

Figure 3:
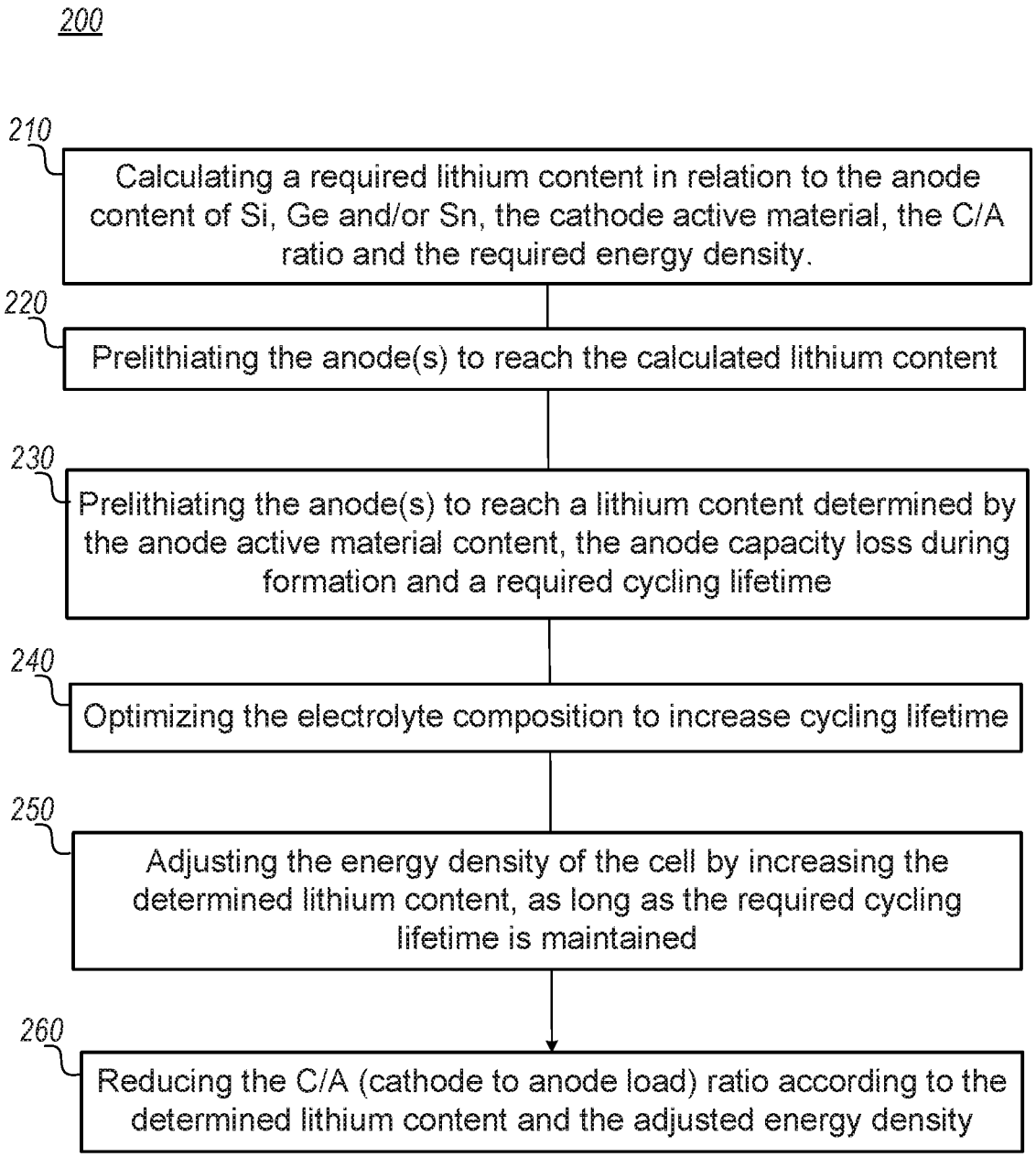
FIG. 3 is a high-level flowchart illustrating a method, according to some embodiments of the invention.

FIG. 3 is a high-level flowchart illustrating a method 200, according to some embodiments of the invention. The method stages may be carried out with respect to cells 100 described above, which may optionally be configured to implement method 200. Method 200 may comprise the following stages, irrespective of their order. Method 200 comprises prelithiating at least one anode of a fast charging cell to reach a lithium content determined by: an anode content of at least one of Si, Ge and Sn, a cathode active material, a C/A ratio and a required energy density (stage 220).

Method 200 may further comprise calculating a required lithium content with relation to the anode content of Si, Ge and/or Sn, the cathode active material, the C/A ratio and the required energy density (stage 210), possibly by at least one computer program product comprising a computer readable storage medium having computer readable program embodied therewith, at least partially implemented by at least one computer processor, and configured to carry out the relevant stages of method 200. The disclosed prelithiation algorithms (e.g., below) correlate among at least some of the following electrode assembly parameters: Li content in the anode, Si content in the anode, cathode chemistry, cathode load, type of electrolyte and the required energy density of the cell.

In various embodiments, method 200 comprises a prelithiation and cell optimization algorithm comprising prelithiating at least one anode of a fast charging cell to reach a lithium content that is influenced and determined by various parameters, such as (i) an anode content of at least one of Si, Ge and Sn, (ii) anode capacity loss during formation and (iii) a required cycling lifetime (stage 230), optimizing an electrolyte of the cell, e.g., by adjusting electrolyte components such as solvents, additives and lithium salts—to increase cycling lifetime (stage 240), adjusting an energy density of the cell by increasing the determined lithium content, as long as the required cycling lifetime is maintained (stage 250), and reducing a C/A (cathode to anode load) ratio according to the determined lithium content and the adjusted energy density (stage 260). The algorithm may be carried out along principles illustrated schematically in FIG. 2 and exemplified, in a non-limiting manner, in the following FIGS. 4A-4C.

In various embodiments, anodes 110 may have a capacity between 500 and 2500 mAh/gr, and be prelithiated to have a lithium content between 25 and 65%. In various embodiments, the C/A (cathode to anode) ratio of the battery cell may be between 0.4 and 0.75. The electrolyte may be configured to create a stable SEI (solid electrolyte interphase) and prelithiation 115 may be configured to compensate for capacity loss during a formation stage of the battery cell. In various embodiments, anodes 110 comprise at least 30 wt % or at least 40 wt % of Si, Ge and/or Sn. In various embodiments, the load of anode(s) 110 may be between 1.5 and 15 mg/cm$^2$. In various embodiments, the load of cathode(s) 120 may be between 10 and 35 mg/cm$^2$. In various embodiments, the energy density of cells 100 may be between 180 and 300 Wh/kg.

Figure 4A:
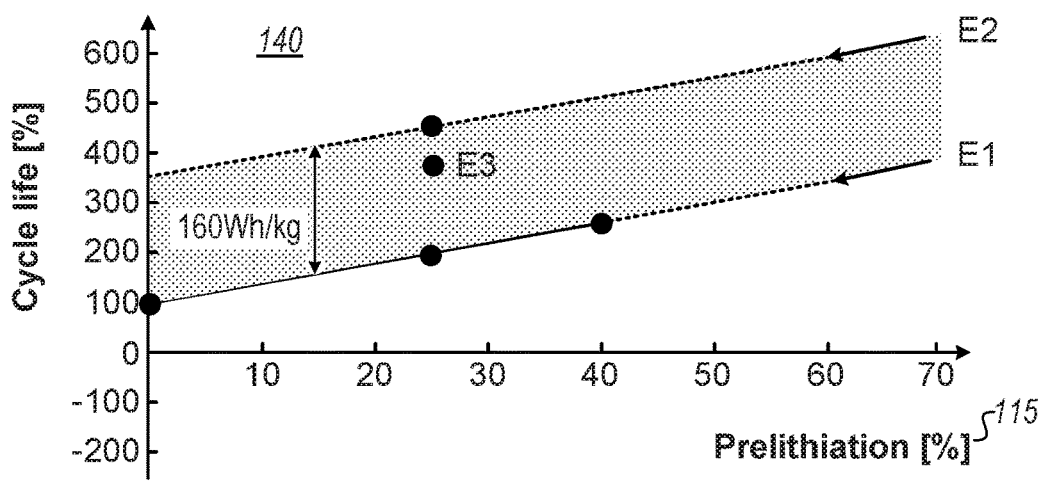
FIG. 4A-4C provide high-level schematic graphics illustrating trends and interpretations providing the disclosed prelithiation algorithms, according to some embodiments of the invention.
Figure 4B:
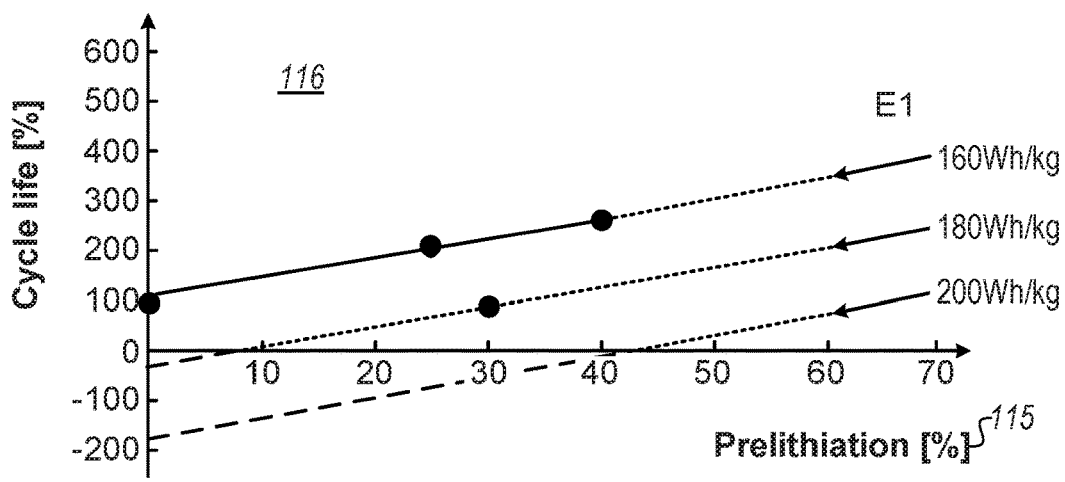
Figure 4C:
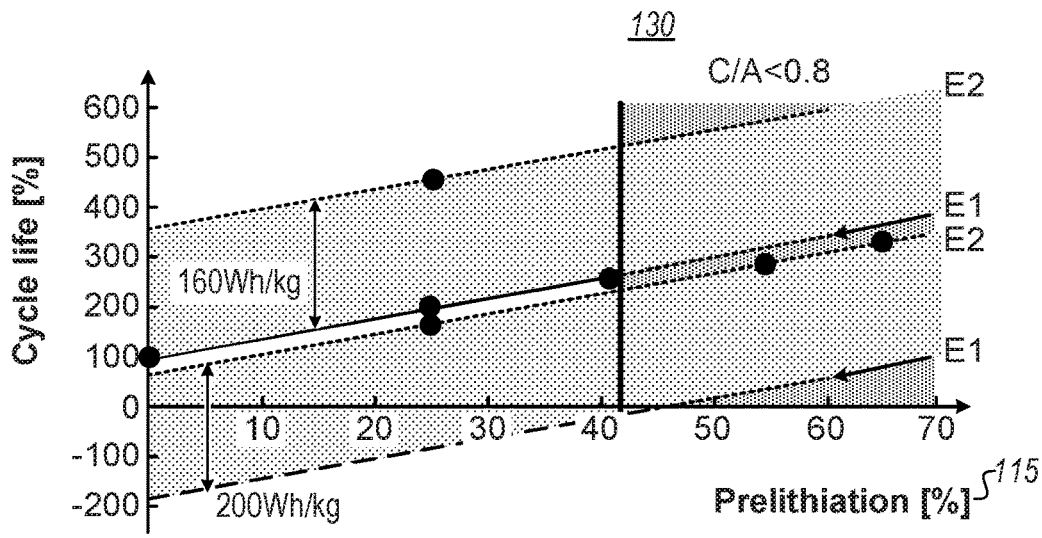

Table 1 provides a list of experiments that relate cell performance in terms of energy density and cycling lifetime to a range of cell parameters such as electrode characteristics, type of electrolyte and the level of prelithiation. FIG. 4A-4C provide high-level schematic graphics illustrating trends and interpretations providing the disclosed prelithiation algorithms, according to some embodiments of the invention. Based on the data, FIG. 4A illustrates schematically the dependence of the cycling lifetime on the extent of prelithiation and on the type of electrolyte (E1, E2 and E3), FIG. 4B illustrates schematically the dependence of the cycling lifetime on the extent of prelithiation and on the energy density, FIG. 4C illustrates schematically the dependence of the cycling lifetime on the extent of prelithiation, on the type of electrolyte, on the energy density as well as on the cathode to anode ratio (indicated by the axes, parameters and indications in FIG. 4C). It is noted that not all dots in the figures are from the table and not all table entries are in the figures, as the figures are intended to provide extrapolated trends that explain the prelithiation algorithm provided herein. Dotted lines illustrate the extrapolated trends, and broken lines illustrate extrapolated trends beyond and below zero cycling lifetime, which are immaterial technically but illustrate the way adjusting the disclosed parameters influences the illustrated lines.

In the table, all cells have Si-based anodes with 40-45% Si. The cycling electrolytes comprise E1: 30 wt % VC, 35 wt % EB, 35 wt % BA, 1M LiPF$_6$ salt; E2: 30 wt % VC, 35 wt % EB, 35 wt % BA, 1M LiPF$_6$ salt, RAFT RS549—0.3-0.9 wt %; E3: 10 wt % VC, 45 wt % EB, 45 wt % BA, 1M LiPF$_6$ salt, RAFT RS549—0.3-0.9 wt %; and additional prelithiation electrolytes comprise: E4: 30 wt % FEC, 70 wt % EMC, 2 wt % VC, 1M LiPF$_6$ salt; E5: 30 wt % FEC, 34 wt % EB, 34 wt % BA, 2 wt % VC, 1M LiPF$_6$ salt; E6: 30 wt % VC, 35 wt % EB, 35 wt % BA, 1M LiPF$_6$ salt; E7: 20 wt % VC, 40 wt % EB, 40 wt % BA, 1M LiPF$_6$ salt, RAFT RS460—0.3-0.9 wt %; where the following abbreviations apply: EB—Ethyl butyrate; BA—Butyl Acetate; FEC—Flouroethylene carbonate; VC—Vinylene Carbonate; EMC—Ethyl-methyl carbonate; and RAFT RS549 and RS460 represented by:

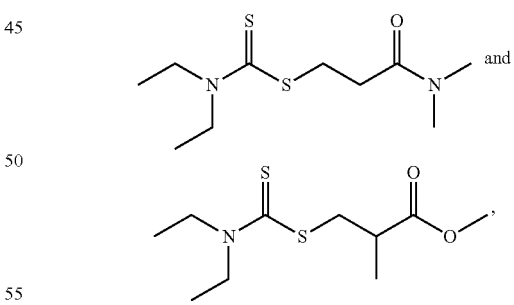

respectively. The baseline data includes Baseline1 for the data involving no prelithiation and 6 C charging rates, and Baseline2 for the data with 25% prelithiation and C/3 charging rates. Both baseline cases are denoted in Table 1 and appear at the start of the respective data relating to them (only the last two data points relate to Baseline2 while the rest relate to Baseline1), providing the approximate increase in cycling lifetime with respect to the corresponding baseline.

TABLE 1

A list of experiments relating cell performance to cell parameters.

| C/A ratio | Anode Load (mg/cm²) | Cathode Load (mg/cm²) | Prelithiation % | Prelithiation Electrolyte | Cycling Electrolyte | Charging C-rate | Energy Density, Wh/kg | Cycle Life % vs Baseline |
|---|---|---|---|---|---|---|---|---|
| 0.89 | 2.10 | 15.32 | 0 | E1 | E1 | 6 C | 160 | Baseline1 |
| 0.89 | 2.10 | 15.30 | 0 | E3 | E3 | 6 C | 200 | ~30 |
| 0.89 | 2.10 | 15.32 | 25 | E4 | E1 | 6 C | 160 | ~95 |
| 0.89 | 2.14 | 15.68 | 25 | E5 | E1 | 6 C | 160 | ~115 |
| 0.89 | 2.17 | 15.81 | 25 | E6 | E1 | 6 C | 160 | ~260 |
| 0.89 | 2.08 | 15.12 | 25 | E1 | E2 | 6 C | 160 | ~450 |
| 0.87 | 2.01 | 15.31 | 25 | E1 | E3 | 6 C | 160 | ~340 |
| 0.87 | 2.09 | 15.94 | 25 | E1 | E1 | 6 C | 160 | ~200 |
| 0.95 | 1.97 | 15.93 | 30 | E1 | E1 | 6 C | 180 | ~100 |
| 0.89 | 2.17 | 15.93 | 40 | E1 | E1 | 6 C | 160 | ~260 |
| 0.88 | 2.07 | 16.56 | 25 | E1 | E1 | 6 C | 160 | ~200 |
| 0.87 | 2.01 | 15.31 | 25 | E1 | E3 | 6 C | 160 | ~340 |
| 0.95 | 2.10 | 17.04 | 25 | E1 | E3 | 6 C | 200 | ~70 |
| 0.50 | 3.57 | 15.46 | 55 | E1 | E3 | 6 C | 200 | ~240 |
| 0.50 | 3.50 | 14.00 | 65 | E6 | E2 | 6 C | 200 | ~330 |
| 0.50 | 3.50 | 14.00 | 25 | E1 | E3 | C/3 | 240 | Baseline2 |
| 0.55 | 4.60 | 20.30 | 55 | E6 | E2 | C/3 | 240 | ~400 |
| 0.70 | 3.55 | 20.30 | 55 | E6 | E2 | C/3 | 240 | ~400 |

FIG. 4A-4C provide high-level schematic graphics illustrating trends and interpretations providing the disclosed prelithiation algorithms, according to some embodiments of the invention. In all cases, under otherwise constant conditions, the inventors have found out that the level of prelithiation 115 has a linear effect on the cycling lifetime (illustrated schematically by the extrapolated dotted and broken lines). This surprising discovery is used herein to enable optimizing the extent of prelithiation and the cell components as explained. FIG. 4A illustrates the linear relation for different electrolytes, exemplifying the available range (represented by the band) for adjusting electrolytes 140 to maximize the cycling lifetime of the cell, with the same energy density (i.e. 160 Wh/kg). Either or both formation electrolytes and cycling electrolytes may be optimized, e.g., by adjusting the type(s) and/or amount(s) of their solvent(s), additive(s) and/or lithium salt(s). Following optimization, energy density 116 may be increased, as illustrated schematically in FIG. 4B, by further increasing the determined lithium content, e.g., for the optimized electrolyte, as long as the required cycling lifetime is maintained. It is noted that the broken line indicates cells that do not function, having lower than zero cycling lifetime—it can be seen however that raising prelithiation 115 sufficiently enables reaching operative cells. FIG. 4C schematically illustrates the possibility of enabling cells with high lithiation rates by reducing C/A ratio 130. As explained above, high lithiation rates 115 pose a risk of metallization on anodes 110, that has been found herein to be avoidable by reducing the cathode capacity. For example, in a non-limiting manner, the area above 40% lithiation is indicated as requiring C/A ratio 130 to be reduced below 0.8. It is also noted that the linear relations between the extent of prelithiation (FIG. 4A), the energy density (FIG. 4B) and the cycling lifetime—allows predicting cell performance under different conditions (with the same electrolyte), as illustrated schematically by the two bands shown in FIG. 4C—referring to two levels of energy density, with each band defined by the range of electrolyte types that provide the values in each band. The inventors further note that reducing the charging rates enables to increase the energy density. For example, referring to FIGS. 4B and 4C, which provide the curves for 6 C charging rates, similar curves for C/3 charging rates were found to support ca. 20% higher energy densities, e.g., the curve for 200 Wh/kg at 6 C is roughly equivalent to the curve for 240 Wh/kg at C/3.

Disclosed fast charging lithium ion batteries may be configured, e.g., by selection of materials, to enable operation at high charging and/or discharging rates (C-rate), ranging from 3-10 C-rate, 10-100 C-rate or even above 100 C, e.g., 4 C, 5 C, 10 C, 15C, 30 C or more. It is noted that the term C-rate is a measure of charging and/or discharging of cell/battery capacity, e.g., with 1 C denoting charging and/or discharging the cell in an hour, and XC (e.g., 5 C, 10 C, 50 C etc.) denoting charging and/or discharging the cell in 1/X of an hour—with respect to a given capacity of the cell.

Fast charging cells may comprise rechargeable Li-ion cells having anode material based on metalloids such as Si, Ge and/or Sn, as taught e.g., by any of U.S. Pat. Nos. 9,472,804, 10,096,859, 10,454,101 and 10,199,677, and by U.S. Patent Application Publication No. 2017/0294687, which are incorporated herein by reference in their entirety. Disclosed embodiments may be applied to metalloid (Si, Ge and/or Sn)-based anodes for fast charging lithium ion cells.

The active material particles may comprise metalloids such as Si, Ge and/or Sn particles or combinations thereof, metals such as Mn and/or Fe and/or carbon-based material such as graphite and/or graphene, and/or combinations thereof as anode material, and the metallic porous structure may comprise aerogel/foam made of any of aluminum, nickel, copper, gold, titanium, stainless steel, their combinations and/or their alloys; and/or the active material particles may comprise any of NCA-based, NMC-based, LFP-based, LNM-based and/or LMO-based particles as cathode material and the metallic porous structure may comprise aerogel/foam that comprise aluminum, nickel and/or stainless-steel their combinations and/or their alloys. In any of these cathode materials, primary particles rather than secondary particles may be used in disclosed cathodes.

It is noted that the cells may comprise separator(s) made of various materials, e.g., polymers such as any of polyethylene (PE), polypropylene (PP), polyethylene terephthalate (PET), poly vinylidene fluoride (PVDF), polymer membranes such as a polyolefin, polypropylene, or polyethylene membranes. Multi-membranes made of these materials, micro-porous films thereof, woven or non-woven fabrics etc. may be used as separator(s), as well as possibly composite materials including, e.g., alumina, zirconia, titania, magnesia, silica and calcium carbonate along with various polymer components as listed above.

The electrolytes may comprise linear and cyclic carbonate solvents such as dimethyl carbonate (DMC), diethyl carbonate (DEC), ethyl methyl carbonate (EMC) or esters such as ethyl acetate (EA), propionates and butyrates; and ethylene carbonate (EC), fluoroethylene carbonate (FEC) or vinylene carbonate (VC), respectively. For example, electrolytes may comprise a large proportion, e.g., 10%, 20%, 30% or more of VC and/or FEC as prominent cyclic carbonate compound, as disclosed e.g., in U.S. Pat. No. 10,199,677, incorporated herein by reference in its entirety. The electrolytes may comprise solid or semi-solid electrolytes, such as polymeric electrolytes, e.g., polyethylene oxide, fluorine-containing polymers and copolymers (e.g., polytetrafluoroethylene), flexible polymeric and/or gel electrolytes, and/or combinations thereof, e.g., as taught e.g., by WIPO Publication No. 2018109774, incorporated herein by reference in its entirety. The electrolytes may further comprise lithium electrolyte salt(s) such as $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, LiTFSI, $LiB(C_2O_4)_2$, $LiBF_2(C_2O_4)$), tris(trimethyl-silyl)phosphite (TMSP), and combinations thereof. Various electrolyte compositions and additives are disclosed in U.S. Patent Application Publication No. 2019/0356013, which is incorporated herein by reference in its entirety.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

We claim:

1. A method for configuring and prelithiating a fast charging cell, the method comprising:
    prelithiating at least one anode of the fast charging cell to reach a lithium content determined by:
        an anode content of at least one of Si, Ge and Sn,
        anode capacity loss during formation, and
        a required cycling lifetime;
    wherein the fast charging cell comprises at least one cathode and is configured to be charged at a maximal charging rate of at least 4 C;
    adjusting components of at least one electrolyte of the fast charging cell to increase cycling lifetime,
    adjusting an energy density of the fast charging cell by increasing the determined lithium content, as long as the required cycling lifetime is maintained, and
    reducing a C/A (cathode to anode load) ratio according to the determined lithium content and the adjusted energy density.

2. The method of claim 1, wherein the at least one anode comprises at least 20 wt % of at least one of Si, Ge and Sn, and wherein the prelithiation is carried out to reach at least 40% lithium content.

3. The method of claim 1, wherein a load of the at least one anode is between 1.5 and 15 $mg/cm^2$, a load of the at least one cathode is between 10 and 35 $mg/cm^2$, an energy density of the fast charging cell is between 180 and 250 Wh/kg, and the C/A ratio of the fast charging cell is between 0.4 and 0.75.

4. The method of claim 1, wherein the at least one electrolyte is optimized by adjusting types and amounts of at least one solvent, at least one additive and/or at least one lithium salt in the at least one electrolyte.

5. The method according to claim 1, comprising calculating the C/A ratio while taking into account only electrochemically active surface areas of the anode and the cathode.

6. The method according to claim 1, comprising calculating the C/A ratio while taking into account only surfaces of the anode and the cathode that face each other and take part in a lithium flow through the electrolyte, while ignoring border areas of the anode and the cathode.

7. The method according to claim 1, comprising determining a level of the prelithiating based on a linear relationship between the level of the prelithiating and a cycling lifetime of the fast charging cell.

8. The method according to claim 1, comprising determining a level of the prelithiating and determining an adjusting of the energy density of the fast charging cell based on a linear relationship between the level of the prelithiating, a cycling lifetime of the fast charging cell and the energy density of the cell.

9. The method according to claim 1 wherein the at least one electrolyte comprises a formation electrolyte and a cycling electrolyte.

10. The method according to claim 1, wherein the fast charging cell is configured to be charged at a maximal charging rate of at least 10 C.

* * * * *